United States Patent
Kelly et al.

(10) Patent No.: US 6,766,910 B1
(45) Date of Patent: Jul. 27, 2004

(54) DISK STORAGE RACK

(75) Inventors: Kerry Kelly, 514 Park Cir., Basalt, CO (US) 81621; Oliver Hoffmann, 58 Orchard Hill Rd., Newton, CT (US) 06470; Mark Wertheimer, Baltimore, MD (US); Joseph Gasparino, New York, NY (US)

(73) Assignees: Kerry Kelly, Basalt, CO (US); Oliver Hoffmann, Newton, CT (US)

( * ) Notice: Subject to any disclaimer, the term of this patent is extended or adjusted under 35 U.S.C. 154(b) by 0 days.

(21) Appl. No.: 10/384,872

(22) Filed: Mar. 7, 2003

(51) Int. Cl.[7] ................................................. A47F 5/00
(52) U.S. Cl. ........................ 211/40; 211/163; D6/407
(58) Field of Search .................... 211/40, 41.1, 163, 211/45, 47; D6/407; 206/308.1

(56) References Cited

U.S. PATENT DOCUMENTS

| | | | |
|---|---|---|---|
| 3,498,471 A | * | 3/1970 | Dirkx |
| D278,499 S | * | 4/1985 | Shannon ...................... D6/407 |
| 5,178,286 A | | 1/1993 | Allison, III |
| D333,225 S | * | 2/1993 | Robinson ...................... D6/407 |
| 5,318,175 A | | 6/1994 | Stevens |
| 5,344,028 A | * | 9/1994 | Angele ........................ 211/40 |
| 5,385,397 A | * | 1/1995 | Chow ....................... 211/40 X |
| 5,400,902 A | | 3/1995 | Kaminski |
| 5,533,614 A | | 7/1996 | Walker |
| 5,697,684 A | | 12/1997 | Gyovai |
| 5,713,683 A | | 2/1998 | Bergh et al. |
| 5,725,105 A | | 3/1998 | Boland |
| 5,746,334 A | | 5/1998 | Brandenberg |
| 5,857,575 A | | 1/1999 | Watson et al. |
| 5,931,315 A | | 8/1999 | Lorentz et al. |
| 5,964,356 A | | 10/1999 | Gareau et al. |
| 6,039,413 A | | 3/2000 | Ju |
| D429,578 S | | 8/2000 | Vesco |
| 6,119,872 A | | 9/2000 | Flores, Jr. et al. |
| 6,502,703 B2 | * | 1/2003 | Scherer et al. ................ 211/40 |
| 6,691,875 B1 | * | 2/2004 | Schonning ................... 211/40 |

* cited by examiner

Primary Examiner—Robert W Gibson, Jr.
(74) Attorney, Agent, or Firm—George R. McGuire; Bond, Schoeneck & King, PLLC

(57) ABSTRACT

A storage rack for thin flat objects such as CD's, DVD's and the like has multi-lobe "flower-like" pieces which may be stacked for rotation or non-rotation relative to each other. Each flower typically comprises three radially-directed lobes. Each lobe is divided into an outer portion to support an object, and a smaller inner portion for exerting downward pressure against the flat object and hold it in place. The lobes are positioned so that adjacent levels of lobes are radially displaced for viewing objects on underlying lobes.

30 Claims, 10 Drawing Sheets

DISK STORAGE RACK

BACKGROUND OF THE INVENTION

1. Field of the Invention

The invention relates to apparatus for holding flat articles. More particularly, the invention pertains to apparatus for holding and presenting flat articles for use in a working environment.

2. State of the Art

The proliferation of electronic equipment has led to a variety of flat non-covered electronic media devices such as the compact disk (CD), digital video disk (DVD), and other thin devices. Such storage devices are useful for the storage, installation and play of computer software as well as audio, video and audio/video programs such as music, DVD movies, and games, for example. In this document, all of these devices will be simply designated as compact disks (CD's).

Traditionally, CD's are for the most part sold in so-called "plastic jewel boxes" which protect the CD when ;not in use. The jewel box contains an inner clamp which fits into the center hole of a CD to hold it in place, and includes a hinged cover which snaps shut. Typically, the jewel box contains a front label and printed material relating to the CD.

The conventional jewel box has a thickness dimension of about 10-11 mm,which is considerably greater than the 1 mm CD thickness. While most conventional jewel cases are designed to hold one CD, some are capable of holding 2 disks. Jewel boxes of significantly reduced thickness are now available, and have a thickness dimension of about 3–5mm.

To remove a CD from a jewel box, the hinged cover must be opened, and the inner clamp depressed while pulling the CD upward at its edges.

Some CD's are packaged in paper or cardboard containers of typically thin cross-section, or simply placed in paper sleeves.

Typically, both a CD and its package have an identifying label on the face thereof, and if the thickness of the container is sufficient, small lettering identifying the CD may be placed on an edge (spine) of the container. Thus, each CD package is specific to a particular CD, and placement of a CD into a package removes it from view. If a CD is mis-filed, it may be necessary to open each package (e.g. jewel box) until the lost CD is found.

While jewel boxes provide a measure of protection for CD's, the thin plastic walls, the cover hinge, and the inner clamp of such containers may easily crack or break off, particularly in repeated opening/closing of the box. Broken jewel boxes may be unusable, and may have sharp edges which may cut a user's finger. Damaged jewel boxes are typically discarded. In addition, the wide variety of jewel box dimensions (in particular, the thickness) makes it difficult or impossible to file jewel boxes of all sizes in a single storage container.

The CD collection of a user may be extensive, requiring a substantial storage space. Various approaches to disk storage may be found in the art. Prominent among these are various shelves, racks, and cases for holding a substantial number of disks in the jewel boxes, and albums containing pages with plastic inserts into which bare CDs may be inserted. The jewel boxes are typically stored in a stacked arrangement, making recognition of a particular desired jewel box difficult, and the albums quickly become too thick to handle. Often, only the front-most CD in the stack is visibly identifiable. Furthermore, the size of jewel box which is accommodated by a stacked storage rack is typically limited.

In practice, the task of removing CD's from the jewel boxes, keeping track of the empty jewel boxes, and replacing CD's in the correct jewel boxes when finished is very inconvenient. As a result, the user typically places the CD's on a convenient surface after use, not refiling them in their respective Jewel boxes until later, if ever. This is particularly so if the CD's are to be reused in the near future. Moreover, a user generally will seek to utilize his computer time, music set-up time, or DVD set-up time most efficiently, not wishing to spend time manually searching for jewel boxes, removing and placing disks in the correct box, refiling the box in a storage rack, and the like. The result is disorganized CD collections, cluttered work areas, placement of CD's on rough scratch-inducing surfaces, and wasted user time. As is well known, a scratch on the working surface of a CD will render some of the encrypted data unreadable by the laser beam of the electronic reader, resulting in a CD "skip" during play.

Various albums and cases for storing bare (unboxed) CD's are available. Such containers have the same general disadvantages as storage in jewel boxes and the like. For example, album-type storage apparatus typically have special clear plastic pages with tightly fitting pockets for storing CD's. Generally, one side of the CD may be viewed. Typically, each page contains an envelope(s) for storing 1, 2, or 4 CD's per side. A user must leaf through the album until the desired CD is located. Some storage albums incorporate closures of each pocket, typically comprising zippers, VELCRO closures, and the like. In addition, a user may place the CD liner notes or cover art inside the envelope so that each CD has its own specific envelope. If a CD is inserted in the wrong envelope, additional work is required to find it later. In summary, the task of locating, removing and replacing CD's in an album is sufficiently time-consuming so that it may not be used as intended.

Inasmuch as currently available CD storage racks, cases, albums and the like have features which encourage their non-use or limited use during actual application of CD's, an apparatus is needed for interim placement of CD's being used at a computer work station, home CD/DVD player or the like, wherein media disks may be positioned for ready identification, selection, removal for use and temporarily storage prior to returning to more permanent storage.

SUMMARY OF THE INVENTION

The invention comprises a rack or holder for short term storage and use of "bare" media disks and similar thin planar devices. Disks may be inserted and removed quickly by light finger pressure along the disk edge, making the rack very advantageous where disks are used repeatedly for short time periods. The rack is equally usable with enclosed media disks such as 3½ inch "floppies", for example. The rack may be used for storage of any relatively rigid material with a thin cross-section.

The rack of the invention takes up little space, yet each of the disks in the rack is readily identified without disk removal, album page turning, or similar manipulation. A disk may be placed in any unoccupied position of the rack, with a sufficient portion of the disk's front face visible for identification.

The rack of the invention includes one or more "flower pieces", each comprising a plurality (typically three) lobes spaced equilaterally about a center axis of the rack. Each lobe includes an outer portion and a separate inner portion spaced upwardly from the outer portion. A media disk, etc. may be inserted and held between the inner and outer portions of the lobe. Each lobe is intended to accept a single disk or other item. The storage capacity of the rack is customizable by the addition or subtraction of modular components.

BRIEF DESCRIPTION OF THE DRAWINGS

The features and advantages of the present invention can be more readily understood with reference to the following description and appended claims when taken in conjunction with the accompanying drawings, wherein:

DETAILED DESCRIPTION OF THE ILLUSTRATED EMBODIMENTS

Figures 2, 3:
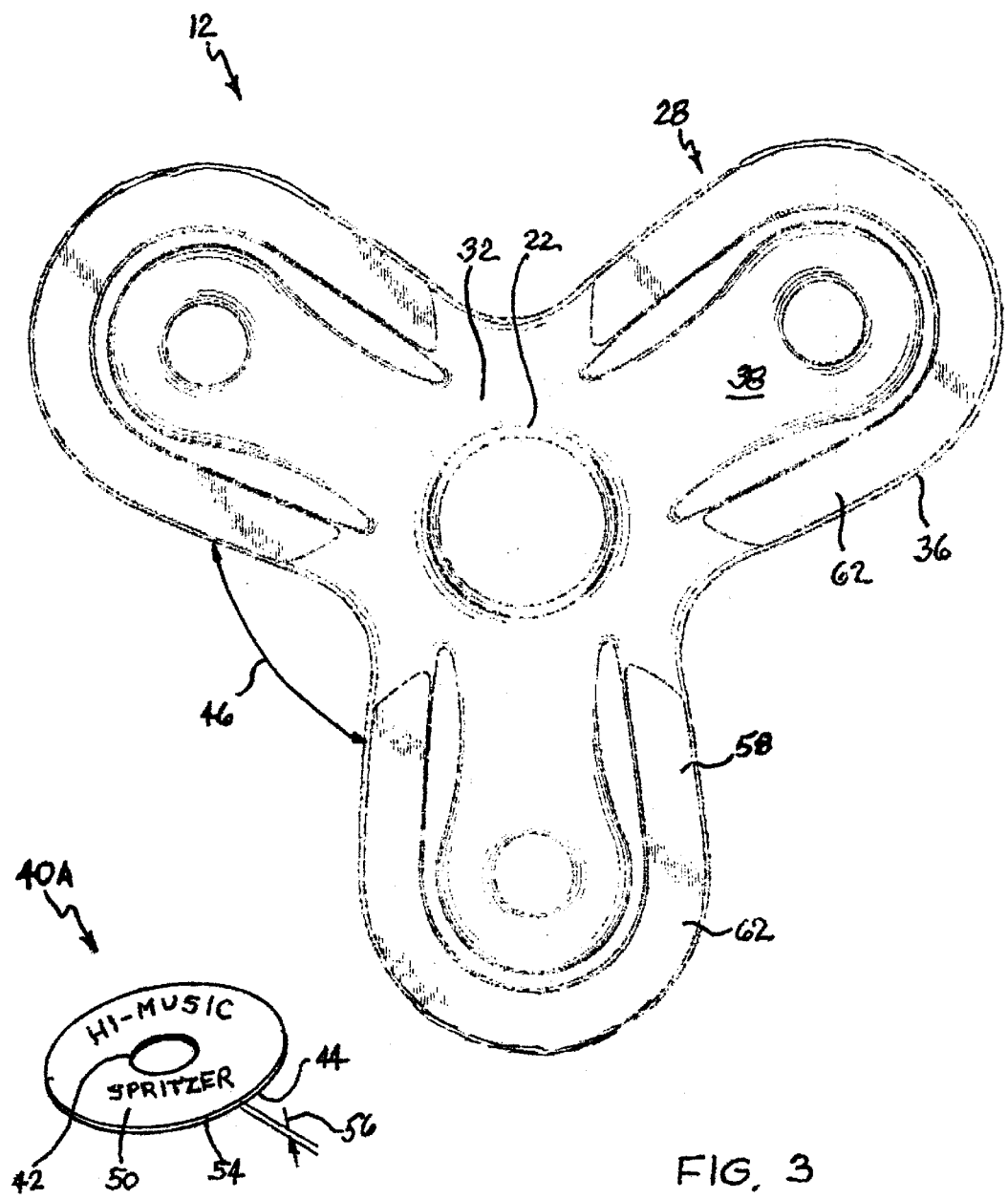
FIG. 2 is a reduced scale perspective view of a typical media disk of the prior art.
FIG. 3 is a top view of an embodiment of a three-lobed modular "flower piece" of a storage rack of the present invention.

As shown in FIG. 2, a conventional CD 40A has a central hole 42, a labeled surface 50, an active (recordable) side 44, and an outer edge 54. Normally, a CD 40A is manually handled by placing fingers on opposite edges 54, or by placing a finger in central hole 42 and an outer edge 54, or by placing fingers on the labeled surface 50 and active surface 44, near edge 54. As written herein, the invention will be directed to storage and presentation of CD's 40A, but it will be understood that the rack may be useful for storage of any thin object capable of being held therein.

Figure 1:
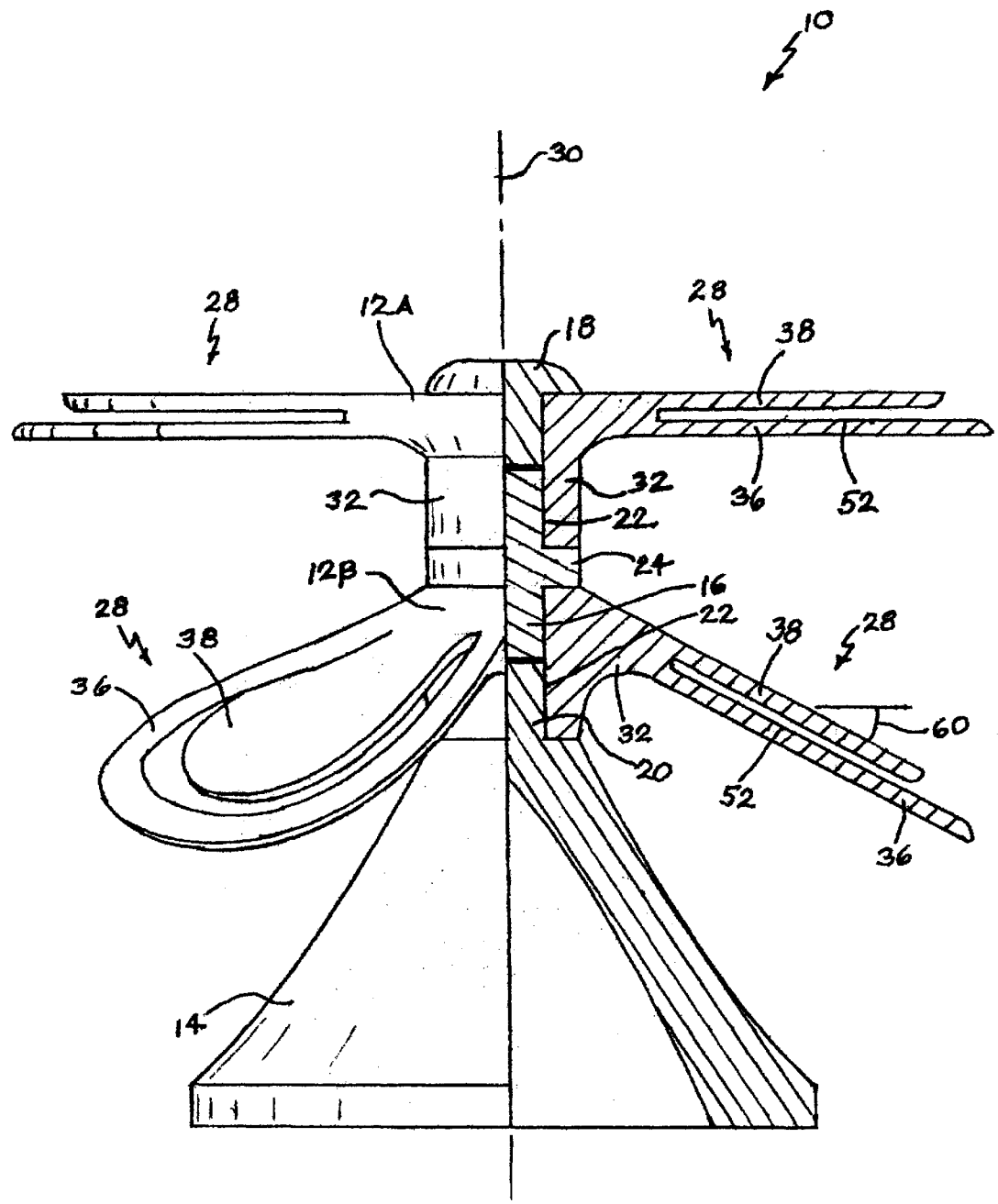
FIG. 1 is a partially sectioned side view of an exemplary storage rack of the present invention.

Referring now to FIG. 1 of the drawings, a side view of a first embodiment of an exemplary storage rack 10 of the invention is shown with a portion in cross-section. Rack 10 is shown with a central axis 30 of rotation about which one or more "flower" pieces 12A and 12B may be rotated. The storage rack 10 holds a plurality of generally that, thin objects 40 such as media disks (CD's arid DVD's 40A, computer floppies) and other objects (not shown in FIG. 1). The figure shows the primary components for a modular rack 10 of two flower pieces 12, but the rack may be varied to have any desired capacity by varying the number of rack components. The rack 10 may be made in a modular form whereby a user can vary the capacity to suit a particular need.

The components of storage rack 10 comprise one or more "flower pieces" 12, a lower base 14, and one or more modular stem members 16 for supporti vely joining a flower piece 12 to another flower piece. Each flower piece 12 may be independently rotated about a central axis 30 which passes through the flower piece(s) 12, stem members 16 and base 14. A top cap 18 or stem member 16 may be inserted in the uppermost flower piece 12 as shown.

As illustrated in FIG. 1, an exemplary lower base 14 supports the other components 12, 16, and 18 which comprise the rack 10. Lower base 14 is shown with an integral cylindrical base stem 20 which is insertable into an axial aperture 22 of a lower flower piece 12B. The flower piece 12B is rotatable about the base stem 20. The base 14 itself may be of any shape, and may be hollow or solid. As shown, it is mountable on a flat object such as a desk or table. The base 14 may also be configured to be attachable to a wall, desk, computer monitor, or other object.

Each stem member 16 is shown as a cylindrical shaft with a stop portion 24 of enlarged diameter for proper spacing upon insertion into the axial apertures 22 of the flower pieces 12. The stem member(s) 16 and axial apertures 22 of the flower pieces 12 are sized to permit easy rotation therebetween about central axis 30 by a user's fingers.

Each flower piece 12 has a central body 32 with disk-holding lobular members (lobes) 28 extending outwardly from the body. The number of lobes 28 is shown as three, but as few as one, or a larger number than three may be used along a circumference of a flower piece 12. As the number of lobes 28 per flower piece 12 is increased, the overall diameter 34 of the flower pieces 12 will increase. Three lobes 28 are shown in the figures to illustrate what is believed to be a generally optimum number for most applications with standard size CD's 40A (see FIG. 2), in order to provide interlobular space 46 (see FIG. 3) for viewing the labeled top surfaces 50 of CD's on an underlying flower piece 12B or lower level of the same flower piece, while maintaining a minimal overall rack size for placement on a desk or table, for example.

As shown in FIG. 1, each lobe 28 includes an outer portion 36 which is configured to support a portion of the underside of a flat thin object 40, e.g. the active (recordable) side 44 of a CD 40A. Thus, outer portion 36 is a lower support member for a CD 40A. A smaller inner portion 38 of lobe 28 comprises a secondary lobe which is spaced upwardly from outer portion 36, i.e. is an upper member generally parallel to the lower support member (outer portion 36), and has a bending modulus by which a slight compressive force is exerted on object 40 placed in the space 52 between the outer portion 36 and the inner portion 38. The slight compressive force holds the CD 40A (or other item) in the lobe 28. In the embodiment of FIG. 1, the inner portion 38 (inner lobe) is shown as extending outwardly to cover the central hole 42 of a CD 40A. However, the outer portion 36 and cooperating inner portion 38 may have any shapes by which a CD 40A may be easily inserted therebetween and held firmly, yet permitting easy removal by slight finger pressure. A range of disk thicknesses 56 may be accommodated by a given lobe 28 wherein disks of greater thickness will be subjected to slightly higher compression. For example, conventional computer disks known generally as 3½ inch "floppies" have a case thickness of about 3 mm, and are easily accommodated by a storage rack 10 designed for CD disks 40A of about 1 mm thickness.

As shown in FIG. 1, the lobes 28 of a flower piece 12 may be coplanar as in the upper flower piece 12B, or may be angled downwardly from the central axis 30 as in the lower flower piece 12A. The angle 60 of a lobe 28 from horizontal may theoretically be as much as about 90 degrees, but preferably is less than about 60 degrees. For most desk-top applications, angle 60 is preferably between about 5 degrees and 25 degrees.

FIG. 3 is a top view depicting an example of a three-lobed flower piece 12 with a central body 32 surrounding axial aperture 22. Each lobe 28 has an outer portion 36 and an inner portion 38. In use, the upper surface 58 of the outer portion 36 will contact the active surface 44 of a CD 40A.

As noted in FIG. 3, the axial projection of an inner portion 38 of lobe 28 is substantially entirely within the inner periphery 76 of the outer portion 36, and separated from it laterally.

As depicted in FIG. 3, the upper surface 58 of outer portion 36 which will contact the active surface 44 of a CD 40A may optionally be specially treated or coated with a non-scratch material 62. For example, the surface 58 may be made very smooth. Alternatively, the non-scratch material 62 may comprise a soft non-scratching material such as a soft plastic, fabric, fine-filament brush, felt, rubber or the like which is applied to surface 58.

Each of the rack components, including flower pieces 12, lower base 14, stem members 16 and cap 18 may be readily molded as a single unit. A wide variety of plastic materials may be used. Because of differences in modulus of bending, the lobe thickness may be varied to achieve the desired compressive force to hold a thin object 40 in the lobe 28. Alternatively, for example, each lobe 28 may be molded separately and joined to the flower body 32.

Figure 4:
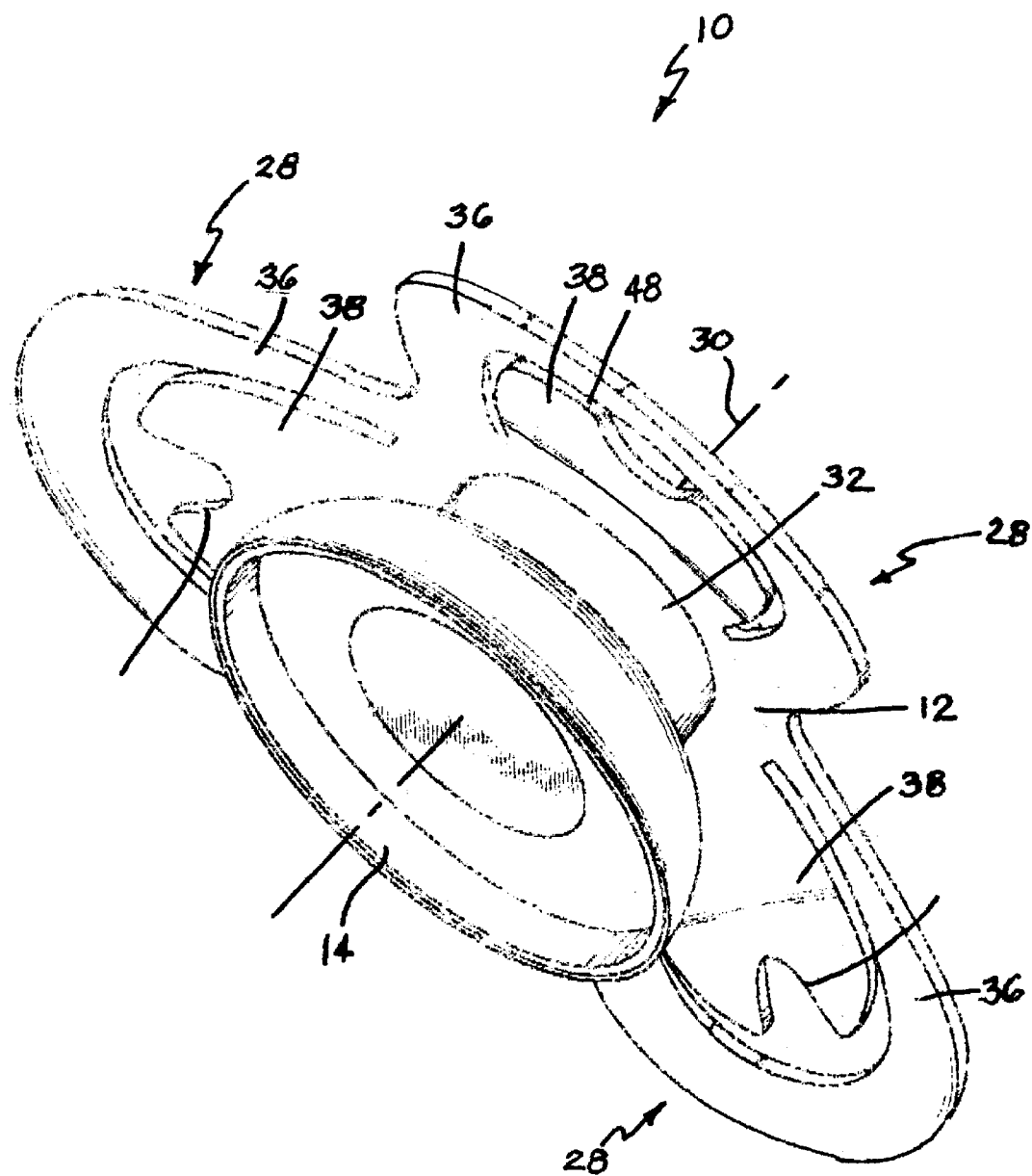
FIG. 4 is a perspective view of an embodiment of a storage rack of the present invention having a single three-lobed "flower piece"

A single-flower embodiment of the storage rack 10 is shown in FIG. 4. The flower piece 12 has three lobes 28 extending uniformly radially from flower body 32 about central axis 30, and project somewhat downwardly. The inner portion 38 of each lobe 28 is raised above the level of the outer portion 36 to hold a CD 40A or other thin object 40 therebetween. Removal of a thin object 40 is enhanced by an indent 64 in the outermost edge 48 of the inner portion 38. This indent 64 permits access to the central hole 42 of a CD 40A by a user's finger for the most proper disk handling procedure. The lower base 14 is configured for placement on a flat surface, e.g. desk or table.

Figure 5:
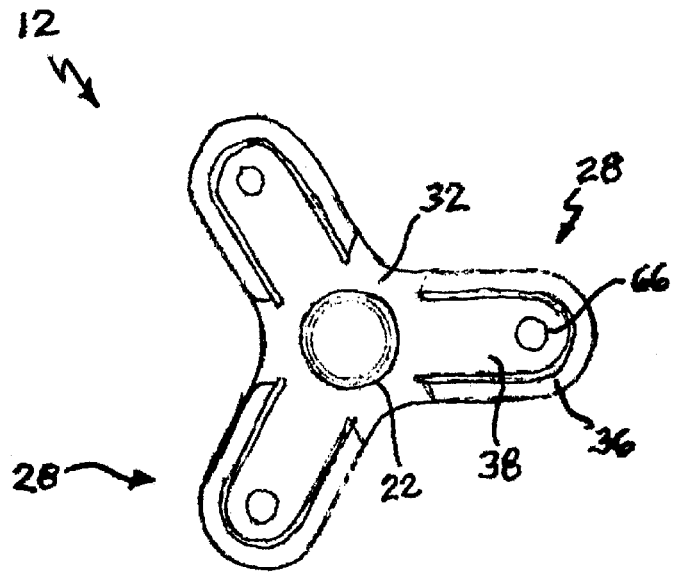
FIG. 5 is a top view of a further exemplary embodiment of a three-lobed "flower piece" of a storage rack of the present invention.
Figure 6:
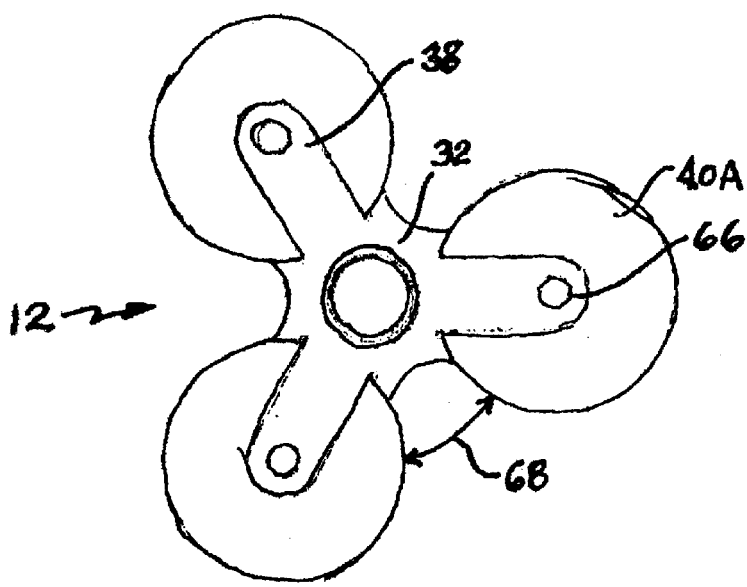
FIG. 6 is a top view of a three-lobed "flower piece" of FIG. 5, with three CD disks inserted therein.
Figure 7:
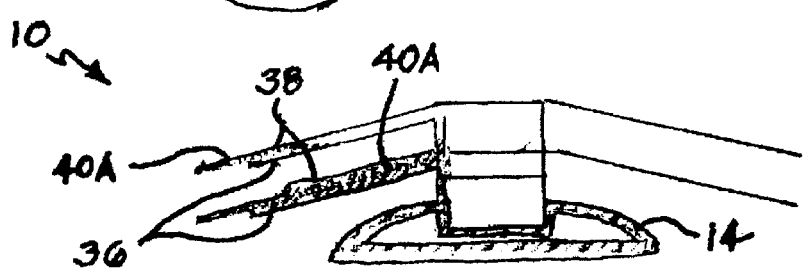
FIG. 7 is a partial cross-sectional side view of a three-lobed "flower piece" of FIG. 6 with CD disks inserted therein, and mounted on a base.

FIGS. 5, 6 and 7 show an embodiment of the storage rack 10 having a flower piece 12 with three lobes 28 projecting radially from the flower body 32. In this embodiment, the inner portions 38 include a cut-out circular portion 66 which generally conforms to the central hole 42 of a fully seated CD 40A. This cut-out portion 66 makes it easier for a distracted user to fully insert a CD in the lobe 28 (FIG. 6) while performing other tasks. FIG. 7 depicts a rack 10 formed of two flower pieces 12 depicted in FIG. 5. The rack 10 is shown with a lobe angle 60 of about 13 degrees for both flower pieces 12. The rack is configured to provide an inter-disk space 68 (see FIG. 6) which enables CD's on a lower flower piece to be readily identified, inserted and removed, even when an upper flower piece is filled.

Figure 8:
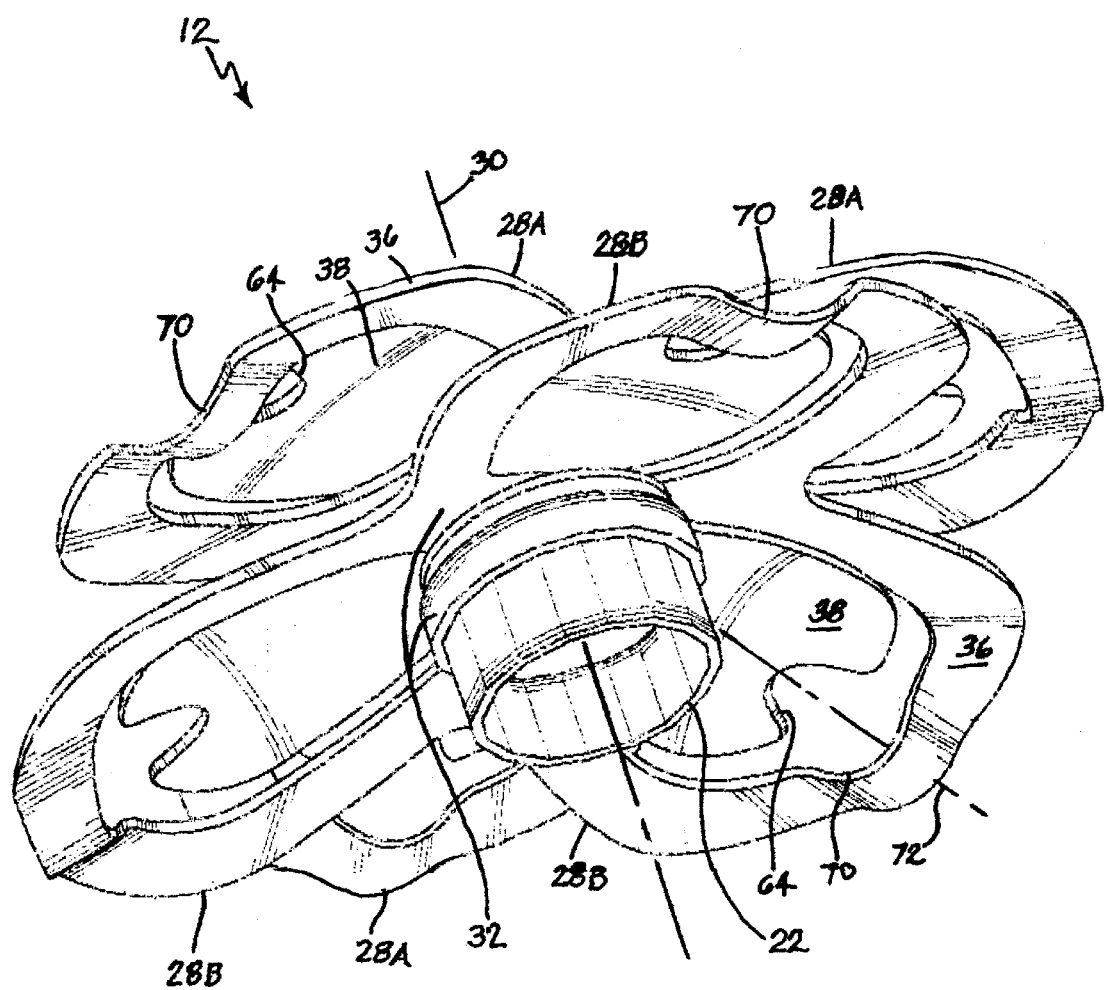
FIG. 8 is a lower perspective view of an exemplary embodiment of two coaxially mounted three-lobe "flower pieces" of a storage rack of the present invention.
Figure 9:
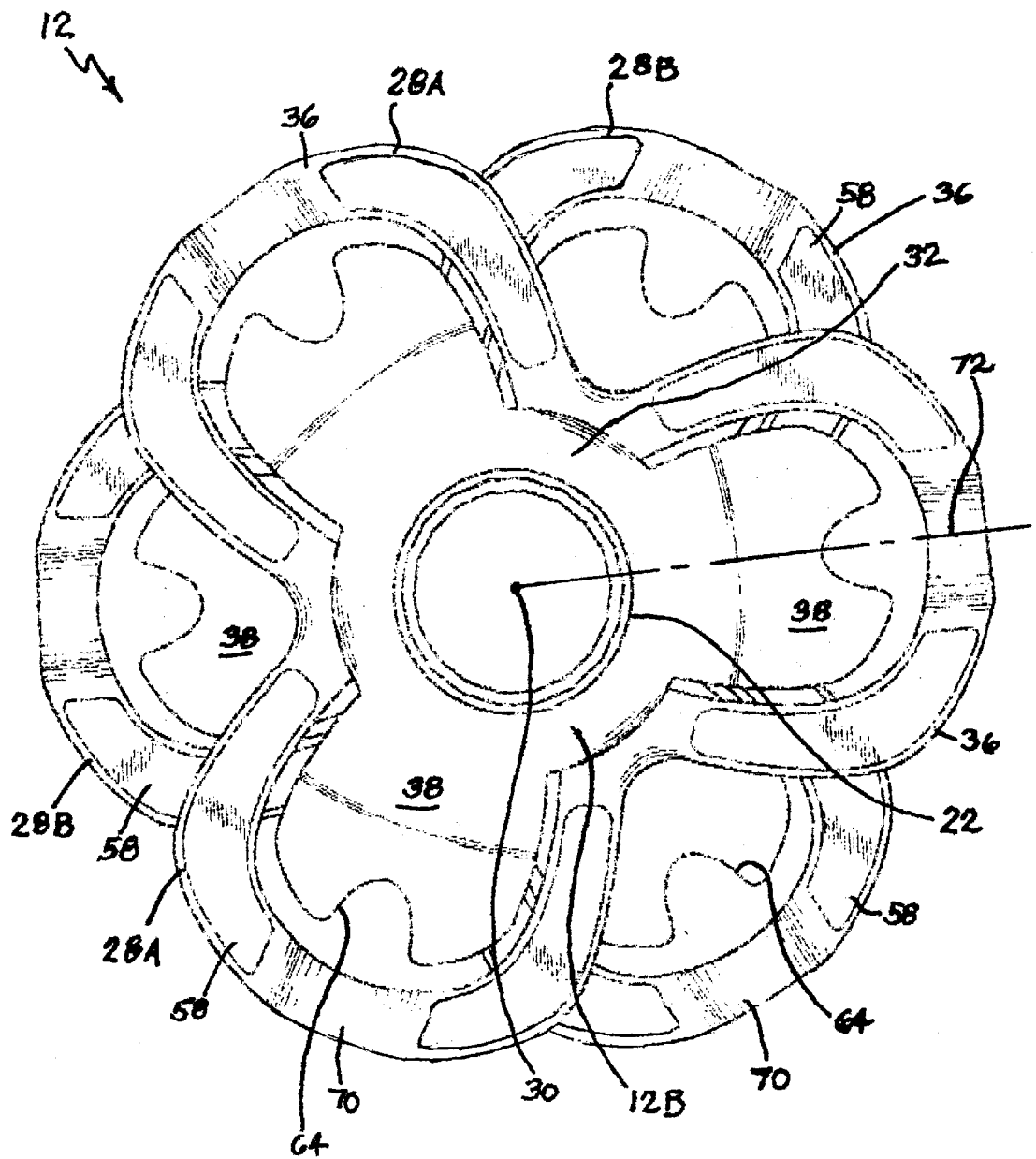
FIG. 9 is a top view of an exemplary embodiment of two coaxially mounted three-lobe "flower pieces" of a storage rack of FIG. 8.

As illustrated in FIGS. 8 and 9, a further embodiment of a flower piece 12 contains more than one level (e.g. two axially spaced rows) of lobes 28. In this embodiment, the lobes 28 in each three-lobe level are radially displaced from the adjacent levels of lobes 28 by 60 degrees, in ord er to identify CD's 40A positioned on a lower level of lobes 28 between the CD's on an overlying level. Thus, the CD's are readily visible for identification, insertion and removal. Where the number of lobes 28 on a level is N, the radial displacement D of adjacent levels is 360/2N. In this figure, the upper lobes are signified by the numeral 28A and the lower lobes by numeral 28B. In this configuration, the two or more levels of flower pieces 12 may be rotated as a unit, although they could be structured to rotate independently of one another via independent couplings. The flower pieces are joined such that adjacent flower pieces 12 are permanently radially displaced from each other. The number of flower pieces 12 which may stacked about axis 30 may theoretically be any number but for most applications is anticipated to be no more than about six.

In addition to having indented portions 64 of the inner portions 38 of each lobe 28, the embodiment of FIGS. 8 and 9 includes depressed portions 70 of the outer portions 36. The indented portion 64 and depressed portion 70 are shown as being bisected by the radial centerline 72 of the lobe 28.

Figure 10:
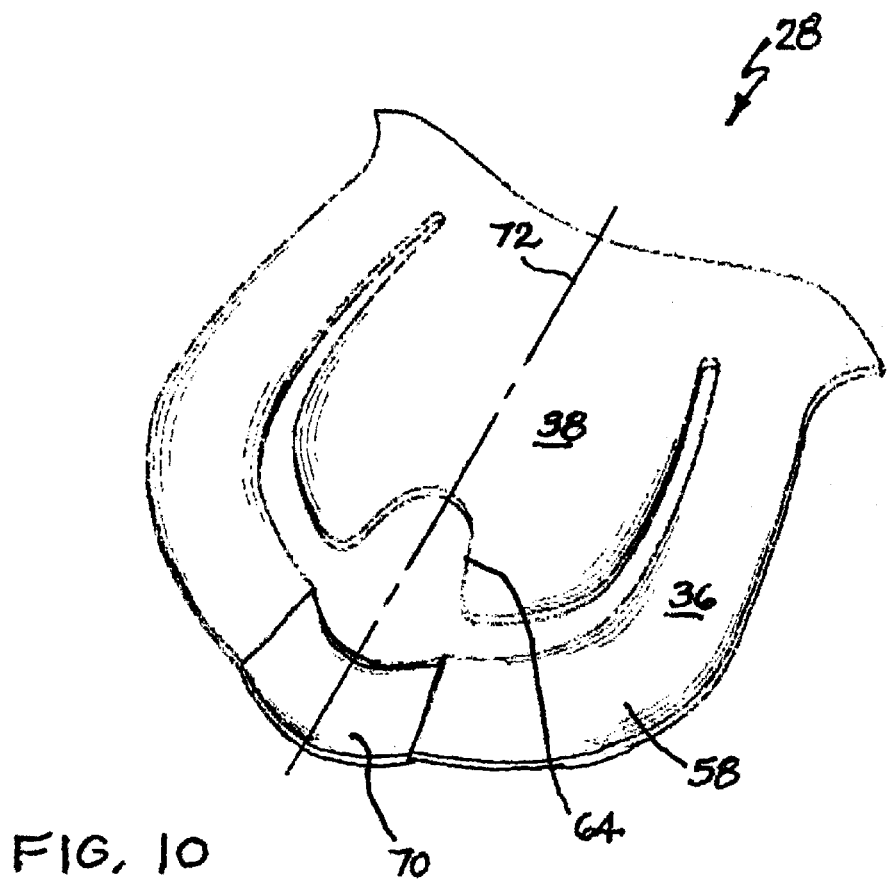
FIG. 10 is an upper perspective view of an exemplary embodiment of a lobe of a "flower piece" in accordance with the present invention.

FIG. 10 depicts a lobe 28 with both an indented portion 64 and a depressed portion 70 bisected by radial lobe centerline 72.

Figure 11:
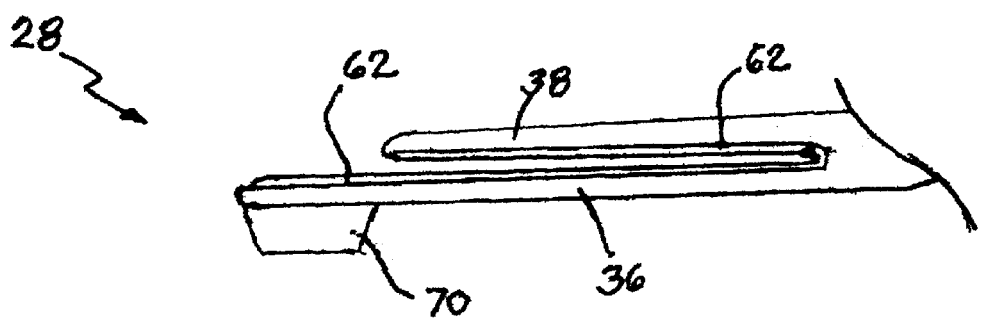
FIG. 11 is a side view of an exemplary embodiment of a lobe of a "flower piece" of FIG. 10.

FIG. 11 depicts a lobe 28 with a non-scratch surface 62 on the underside 78 of the inner lobe portion 38 as well as on the outer lobe portion 36. It is only necessary that one of the surfaces include a non-scratch surface (obviously, the surface that comes in contact with the encoded side of the CD should include the non-scratch surface).

Figure 12:
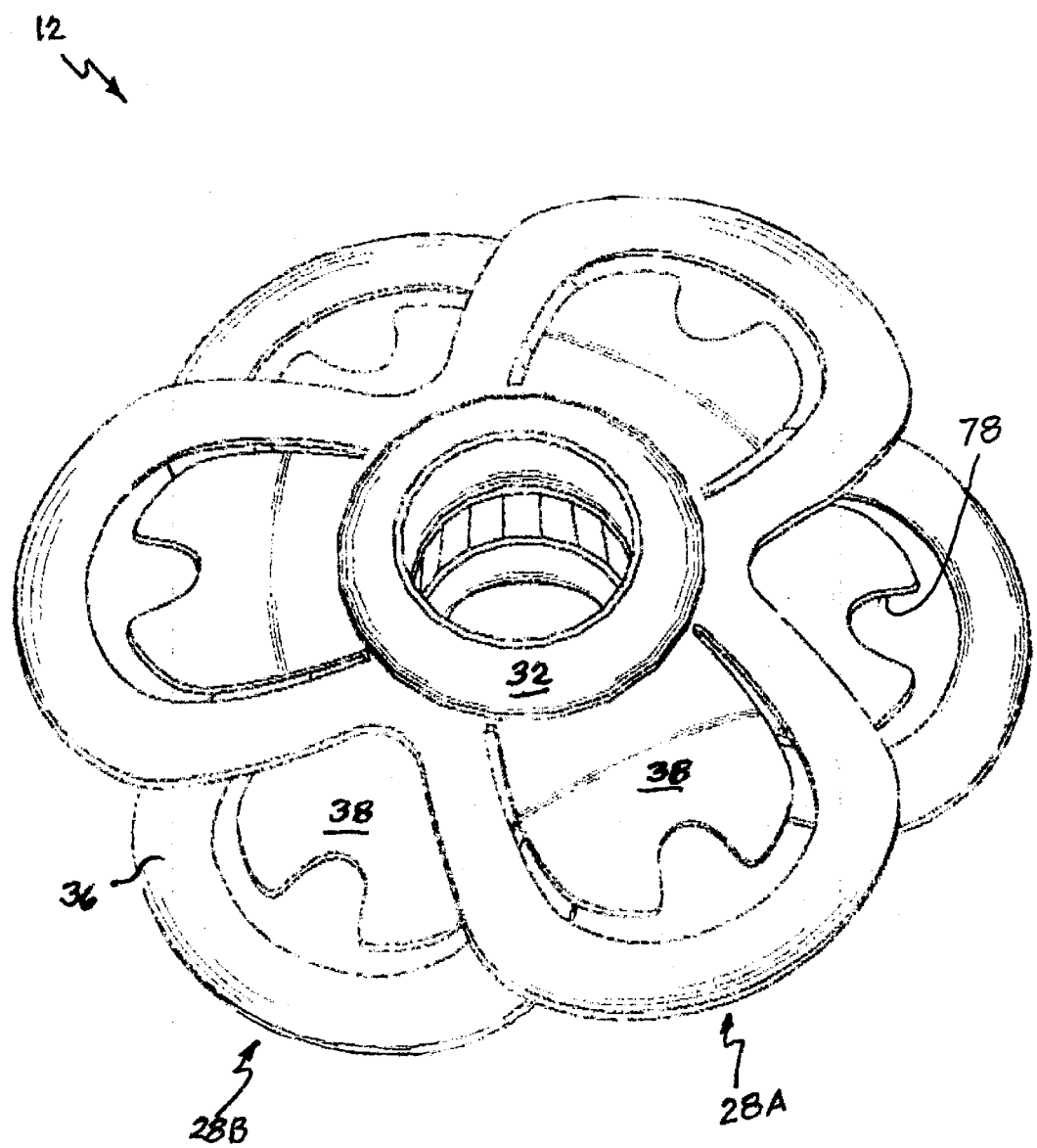
FIG. 12 is an upper perspective view of an exemplary embodiment of two coaxially mounted three-lobe "flower pieces" of a storage rack of the present invention.
Figure 13:
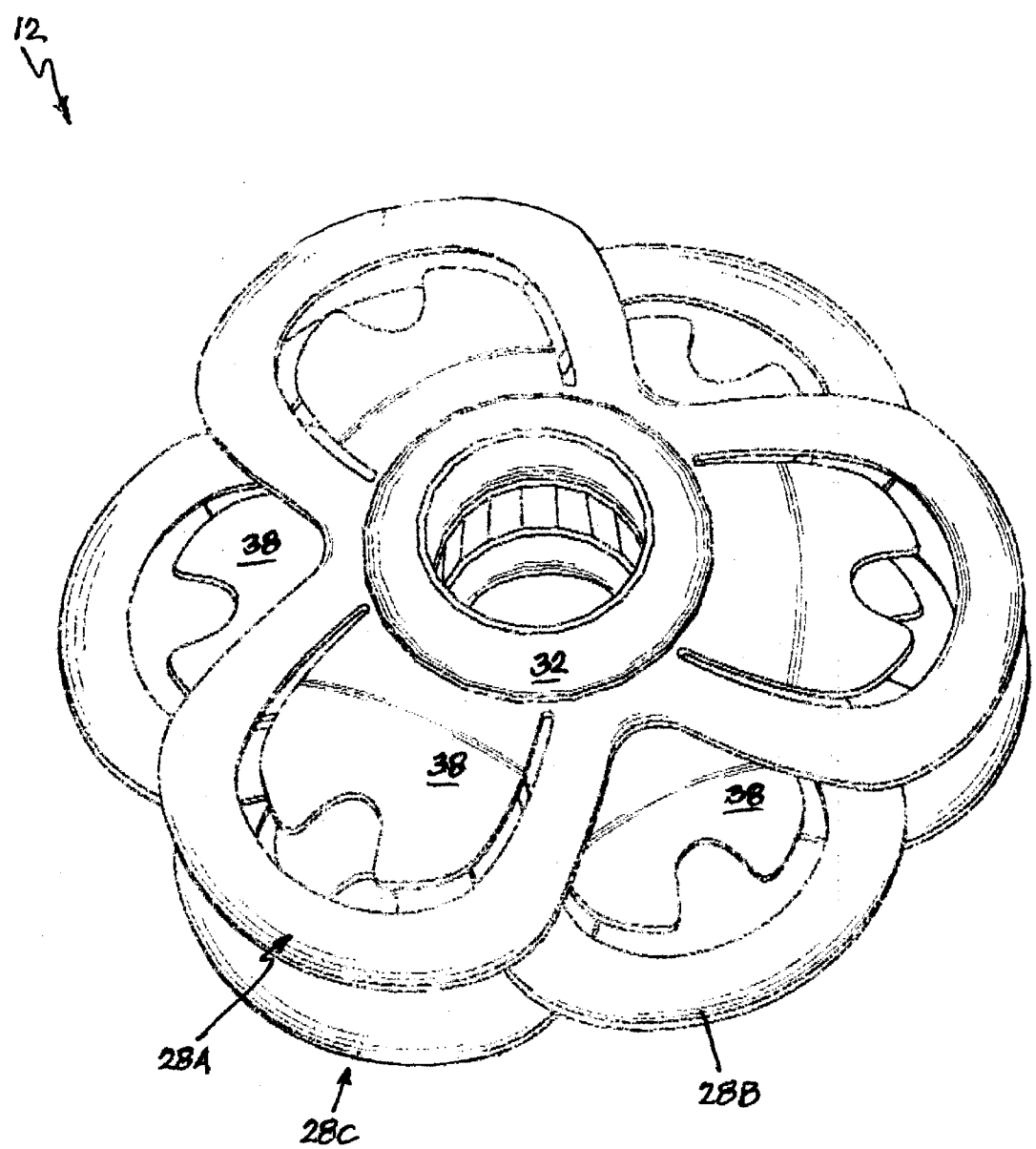
FIG. 13 is an upper perspective view of an exemplary embodiment of three coaxially mounted three-lobe "flower pieces" of a storage rack of the present invention.

An exemplary flower piece 12 is shown in FIG. 12, wherein two levels 74 of lobes 28 are shown. As shown, each level 74 of lobes 28 does not rotate independently of the other level, although they certainly could be modified to rotate independently via independent coupling connectors. The adjacent levels 74 are radially displaced by 60 degrees. In FIG. 13, a flower piece 12 is shown with three levels 74 of axially spaced lobes 28. Again, the adjacent levels of lobes 28 are displaced to enhance visibility of all disks 40A on the rack 10.

Figure 14:
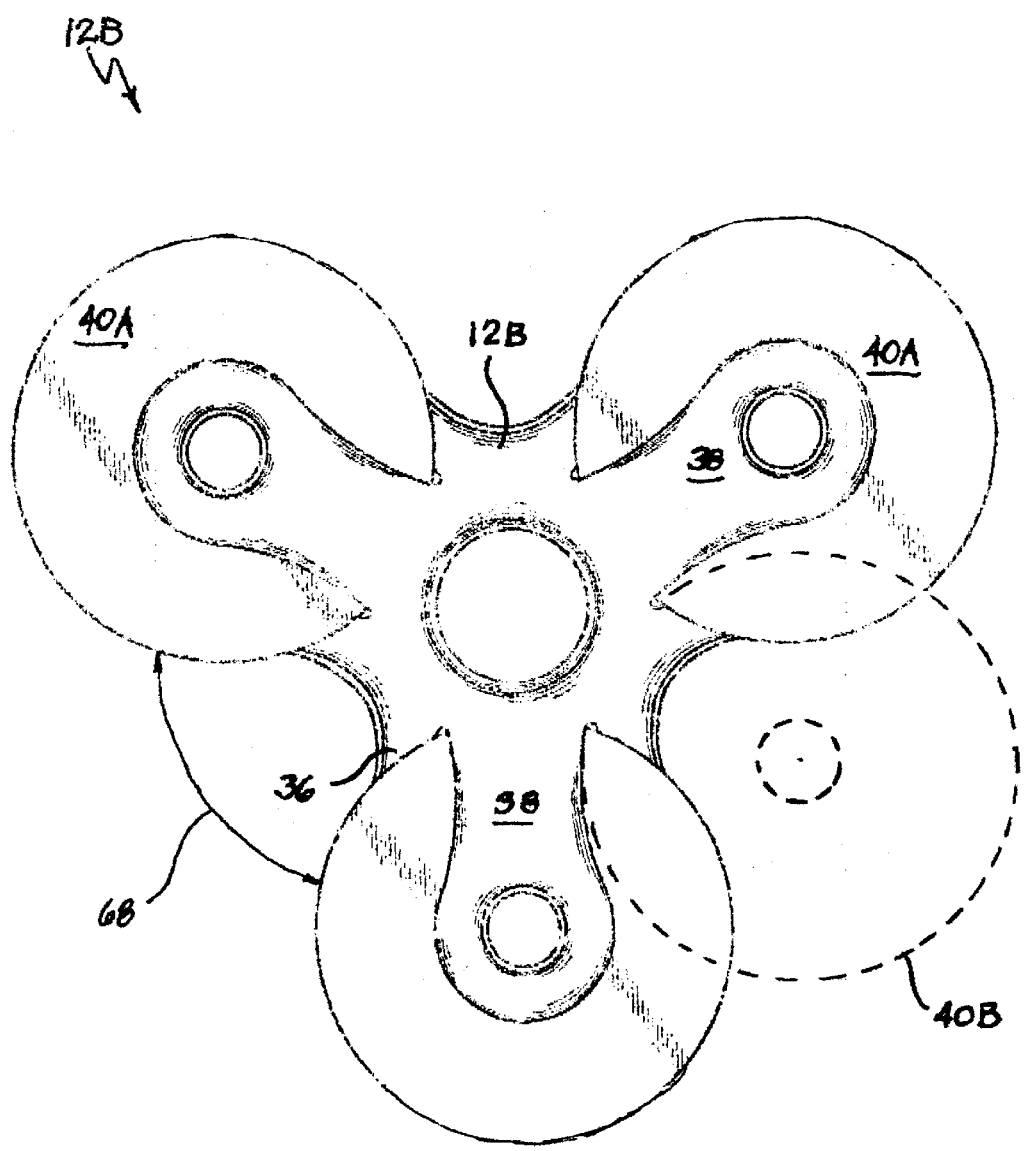
FIG. 14 is a top view of an exemplary embodiment of a three-lobe "flower piece" of a storage rack of the invention, in which are mounted three media disks.

FIG. 14 illustrates a three-lobed flower piece 12B into which CD's 40A have been inserted. When another flower piece 12A underlies flower piece 12B, as shown, a disk 40B inserted in the lower flower piece 12A may be readily identified, inserted and removed from the lower flower piece 12A. The CD 40B is visible because of the large interdisk space 68 between adjacent CD's 40A.

In the various illustrated embodiments of the storage rack, and obvious equivalents thereof, a storage rack is shown which enables quick, easy, convenient and ergonomically efficient storage of unboxed media disks and other thin materials. Minimal finger manipulation is required to properly store and retrieve CD's and the like. A place for temporary storage of frequently used CD's, DVD's and the like enables rapid interchange of disks and eliminates lost, misfiled and damaged disks. Use of the rack for temporary storage of disks during computer program installation, CD music recording/playback and DVD viewing operations is encouraged by the ease of operation. The rack of the invention may be used in conjunction with conventional long term storage devices, to provide a comprehensive media disk storage system.

The storage rack of the invention is versatile, in that its capacity may be modified by adding modular elements. Furthermore, it will hold a wide variety of thin objects of various sizes. The rack will hold a variety of CD's, CD-ROM's, mini-CD's, DVD's, video game disks, standard 3½ inch floppies, and other thin media packages without rack modification. The various media may be intermixed on the rack.

Where the media library is relatively limited, the storage rack of the invention may be used for permanent storage.

The presently described and illustrated embodiments of the invention are to considered as exemplary in all aspects and not restrictive. The scope of the invention is indicated by the appended claims, rather than by the foregoing description. All changes which come within the meaning and range of equivalency of the claims are intended to be embraced therein.

What is claimed is:

1. A rack for holding and presenting a plurality of thin planar devices, comprising: at least one flower piece, comprising:
   a flower piece body with a central axis of rotation;
   at least one lobe radiating from said flower body, said lobe comprising:
      an outer portion of said lobe comprising a lower support member, said outer portion having a generally planar upper surface for the placement of a thin planar device thereon in contact therewith;
      an inner portion of said lobe comprising an upper member, said inner portion having a generally planar lower surface parallel to said lower support member surface and spaced upwardly therefrom;
      wherein said outer portion comprises a peripheral portion of said lobe and said inner portion of said lobe is biased to exert a downward force on said thin planar device on said outer portion of said lobe to hold said thin planar device between said inner and outer portions.

2. A rack in accordance with claim 1, wherein the vertical projection of said inner portion lies substantially within the inner boundary of said outer portion of said lobe.

3. A rack in accordance with claim 1, wherein at least a portion of the upper surface of said outer lobe portion is smooth.

4. A rack in accordance with claim 1, wherein at least a portion of the upper surface of said outer lobe portion comprises a scratchless surface.

5. A rack in accordance with claim 4, wherein said scratchless surface comprises one of soft plastic, fabric, fine-fllament brush, felt and rubber.

6. A rack in accordance with claim 1, further comprising: a base; and means for attaching said flower piece to said base for rotation thereabout.

7. A rack in accordance with claim 6, further comprising an axial aperture through said flower piece.

8. A rack in accordance with claim 7, further comprising a base stem attached to said base and insertable in said axial aperture for supportive rotation of said flower piece thereabout.

9. A rack in accordance with claim 1, wherein the number of disk-holding lobes on said flower piece comprises one of two, three, and four.

10. A rack in accordance with claim 1, wherein said lobes on a flower piece are generally coplanar.

11. A rack in accordance with claim 1, wherein said lobes on a flower piece are angled downwardly from said central axis.

12. A rack in accordance with claim 11, wherein the angle of said lobes with the horizontal is less than about 60 degrees.

13. A rack in accordance with claim 11, wherein the angle of said lobes with the horizontal is about 5–25 degrees.

14. A rack in accordance with claim 1, further comprising at least one secondary flower piece mounted coaxially with said flower piece.

15. A rack in accordance with claim 11, further comprising a stem member for joining said flower piece and said secondary flower piece by placement of said stem member in respective axial apertures in said flower piece and said secondary flower piece.

16. A rack in accordance with claim 15, wherein said secondary flower piece is rotatable relative to said flower piece.

17. A rack in accordance with claim 1, wherein said flower piece comprises:
   a first level of said lobes and a second axially spaced level of lobes, said second level of lobes radially displaced from said first level of lobes by D degrees, where D equals 360/2N and where N equals the number of lobes per flower piece.

18. A rack in accordance with claim 1, further comprising a depressed portion of the outermost portion of each said outer lobe portion.

19. A rack in accordance with claim 1, wherein said inner lobe portions are indented at an outermost portion thereof.

20. A rack in accordance with claim 1, further comprising a hole in said inner lobe portion, the position of said hole corresponding to the center hole of an inserted media disk.

21. A rack in accordance with claim 1, wherein each said lobe is configured to hold and display one electronic media disk.

22. A high-access rack for holding electronic media disks, comprising: a base;
   at least one flower piece comprising:
      a flower piece body;
      an axial aperture through said flower piece body for rotative attachment to said base;
      a plurality of lobes equilaterally spaced about said flower piece and extending radially therefrom, each said lobe comprising:
         an outer peripheral portion of said lobe;
         an inner portion of said lobe, said inner portion separated laterally and vertically from said outer portion of said lobe; and
      wherein said inner portion is adapted to exert a biasing force against a disk inserted between said inner portion and said outer portion, to retain said disk therebetween.

23. A rack of claim 22, further comprising:
   a plurality of flower pieces; and at least one stem member for insertion into said axial apertures to coaxially join said plurality of flower pieces to each other.

24. A rack of claim 23, wherein all of said flower pieces are rotatable as a unit about said base.

25. A rack of claim 23, wherein each of said flower pieces is rotatable relative to other flower pieces.

26. A rack of claim 22, wherein said lobes are angled downwardly from said flower piece body at an angle of about 0 to 25 degrees with the horizontal.

27. A rack of claim 22, wherein said lobes are angled downwardly from said flower piece body at an angle of about 5 to 25 degrees with the horizontal.

28. A rack of claim 22, further comprising an indented portion on the outermost portion of each said inner lobe portion, said indented portion generally corresponding to a center hole of an inserted media disk.

29. A rack of claim 22, further comprising a depressed portion on the outermost portion of said outer lobe portion for finger manipulation of a media disk.

30. A rack of claim 22, wherein said rack is configured to hold and display all of CD's, CD-ROM's, mini-CD's, DVD's, video game disks, and 3½ inch computer disks.

* * * * *